G. W. HUTCHINS.
Shoe-Nail Extractors.

No. 149,313.  Patented April 7, 1874.

Witnesses.  George W. Hutchins.
S. N. Piper.  by his attorney
L. N. Miles.  R. H. Eddy

UNITED STATES PATENT OFFICE.

GEORGE W. HUTCHINS, OF DOVER, NEW HAMPSHIRE, ASSIGNOR TO LAURISTON CHAMBERLAIN, OF SAME PLACE.

IMPROVEMENT IN SHOE-NAIL EXTRACTORS.

Specification forming part of Letters Patent No. 149,313, dated April 7, 1874; application filed February 27, 1874.

*To all whom it may concern:*

Be it known that I, GEORGE W. HUTCHINS, of Dover, of the county of Strafford and State of New Hampshire, have invented a new and useful Improvement in Shoe-Nail Extractors; and do hereby declare the same to be fully described in the following specification and represented in the accompanying drawings, of which—

Figure 1:
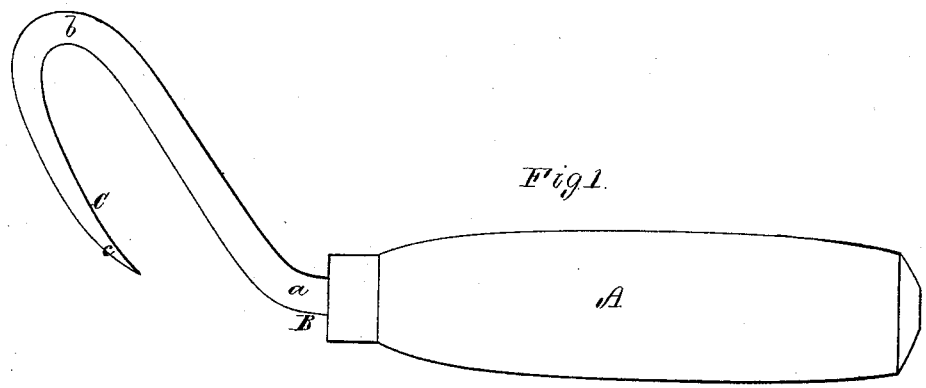
Figure 3:
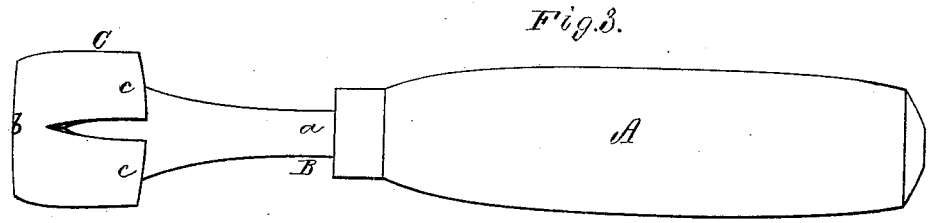
Figure 2:
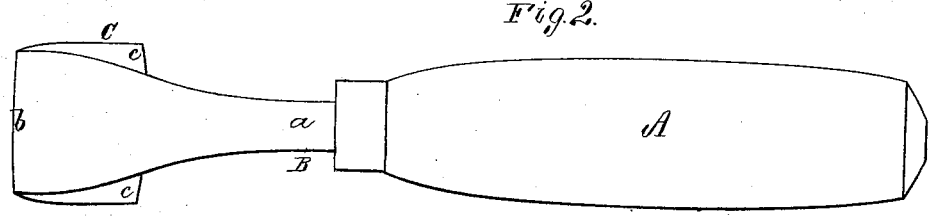
Figure 4:
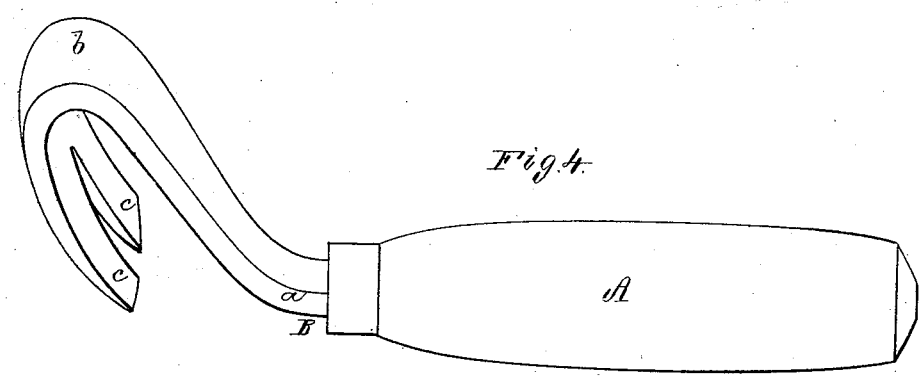

Figure 1 denotes a side elevation, Fig. 2 a top view, and Fig. 3 a bottom view, and Fig. 4 a perspective view, of one of my improved nail-extractors.

In carrying out my improvement I not only construct the shank of the extractor with a bend, so that the part extending from the handle may be at an obtuse angle therewith, but I turn or bend back the claws or head of the extractor underneath, and parallel, or about so, with the shank, all being as represented in the accompanying drawings, in which A denotes the handle, B the shank, and C the furcated or clawed head. The first bend in the shank is shown at *a*, and the second at *b*, the two prongs or claws of the head being represented at *c c*.

By this arrangement of the parts a shoemaker can grasp the tool by the handle and pull it toward him in extracting a tack or nail, and can discharge the nail from between the claws to better advantage than by the ordinary extractor, which has to be pushed forward against the nail or tack in order to effect extraction of it from a shoe when on a last.

The utility of the change I have made in the arrangement of the parts will be readily obvious to most if not all practical shoemakers.

I do not claim a nail-extractor composed of a handle and a forked shank so formed as to require the handle, while the implement is being used, to be held horizontal, or nearly so, and the instrument to be forced forward toward the nail, and the handle to be borne downward to effect extraction of the nail.

With my improved implement the handle is in such a relation with the prongs or claws as to require to be borne upward and pressed away from the operator while a nail is being extracted by the claws, all of which enables the operator to work to better advantage.

What, therefore, I claim is—

The nail-extractor made substantially as described, viz., with its pronged head C turned back under the shank B, and the latter bent at an obtuse angle with reference to the handle A, all as shown and described.

GEO. W. HUTCHINS.

Witnesses:
FRANK W. ROBERTS,
EDWARD P. HODSDON.